(12) United States Patent
Oh et al.

(10) Patent No.: US 7,381,500 B2
(45) Date of Patent: Jun. 3, 2008

(54) METHOD FOR PREPARING A LITHIUM SECONDARY BATTERY COMPRISING A MULTI-PHASE SEPARATOR AND LITHIUM SECONDARY BATTERY MADE USING THE SAME

(75) Inventors: Jeong-won Oh, Cheonan (KR); Su-jin Han, Cheonan (KR); Hyun-jei Chung, Asan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 273 days.

(21) Appl. No.: 10/301,813

(22) Filed: Nov. 22, 2002

(65) Prior Publication Data

US 2003/0118895 A1 Jun. 26, 2003

(30) Foreign Application Priority Data

Nov. 24, 2001 (KR) .............................. 2001-73572

(51) Int. Cl.
  *H01M 6/00* (2006.01)
(52) U.S. Cl. .................. 429/254; 429/142; 429/300; 429/303; 429/163; 29/623.5
(58) Field of Classification Search .............. 429/300, 429/303, 254, 142, 163; 29/623.5
  See application file for complete search history.

(56) References Cited

U.S. PATENT DOCUMENTS 6,610,109 B2 * 8/2003 Noh .......................... 29/623.5

6,881,515 B2 4/2005 Wensley

FOREIGN PATENT DOCUMENTS

| JP | 11-329395 | 11/1999 |
|---|---|---|
| JP | 2001-176554 | 6/2001 |
| JP | 2001-319690 | * 11/2001 |

OTHER PUBLICATIONS

Waters Corporation, "Material Safety Data Sheet, Polyethylene oxide (PEO)", Date of preparation: Jun. 6, 1997; Revision: 1, Aug. 8, 2002.

Office Action issued Dec. 18, 2007 by the Japanese Patent Office for Japanese Patent Application No. 2002-341466.

* cited by examiner

*Primary Examiner*—Laura Weiner
(74) *Attorney, Agent, or Firm*—Stein, McEwen & Bui, LLP

(57) ABSTRACT

A method of preparing a lithium secondary battery including a multi-phase separator having a gelled polymer uniformly impregnated therein, includes surface-treating a porous separator to provide a coated weight of a gelled polymer less than or equal to 20 mg/cm$^2$, by impregnating the porous separator into a gelled polymer solution containing less than or equal to 5 wt % of the gelled polymer based on a weight of an organic solvent. The separator is interposed between a cathode and an anode to prepare an electrode assembly. The electrode assembly is placed into a housing, an electrolytic solution is injected into the housing, followed by sealing and curing a resultant structure.

32 Claims, 6 Drawing Sheets

METHOD FOR PREPARING A LITHIUM SECONDARY BATTERY COMPRISING A MULTI-PHASE SEPARATOR AND LITHIUM SECONDARY BATTERY MADE USING THE SAME

CROSS-REFERENCE TO RELATED APPLICATION

This application claims the benefit of Korean Application No. 01-73572, filed Nov. 24, 2001 in the Korean Intellectual Property Office, the disclosure of which is incorporated herein by reference.

BACKGROUND OF THE INVENTION

1. Field of the Invention

The present invention relates to a lithium battery, and more particularly, to a method of preparing a lithium secondary battery comprising a multi-phase separator and a lithium secondary battery made thereby.

2. Description of the Related Art

With the rapidly continuing development of miniaturized, lightweight and wireless electronic devices, such as cell phones, camcorders, laptop computers and the like, high-energy density lithium secondary batteries are the focus of an intense investigation for use as power sources for driving such electronic devices. According to the type of electrolyte used, a lithium secondary battery can be classified as a lithium ion battery, which uses a liquid electrolyte, or a lithium ion polymer battery, which uses a solid electrolyte. The lithium ion polymer battery using a solid electrolyte is less prone to leakage and has excellent processibility for use as a battery pack.

A gel polymer electrolyte or a hybrid polymer electrolyte is generally used as the polymer electrolyte in the lithium ion battery. The gel polymer electrolyte battery refers to a battery fabricated by solidifying a solution containing a large amount of solvent and/or a plasticizer, a lithium salt and a polymer electrolyte. Since the gel polymer electrolyte battery has poor mechanical strength, the thickness of an electrolyte layer is generally 75 μm or greater, which is too thick compared to a lithium ion battery, resulting in a reduction of energy density. In order to overcome this drawback, there is a known technology in which a porous separator having good mechanical strength is used and the separator is treated with a gelled polymer capable of absorbing an electrolyte (specifically a lithium salt).

In another conventionally proposed technology, a polymer electrolyte is coated on an electrode using an auxiliary solvent for fabrication of a battery. However, according to this technology, it is necessary to strictly control moisture during the process, and separate coating steps are required for a cathode and an anode.

A further conventional technology includes coating a gelled polymer containing a salt onto a porous separator. However, this technology also has a disadvantage in that moisture should be strictly controlled.

Also, there is a known technology in which a gelled polymer is coated onto a porous separator and an electrolytic solution is injected into the porous separator to then be solidified. However, this method has several drawbacks. For instance, a time required for uniform impregnation of the electrolytic solution during injection of the electrolytic solution is prolonged. Also, in the case of a stacking-type battery in which electrode plates should be tightly bonded to a separator, it is quite difficult to tightly bond the electrode plates under the temperature and pressure conditions where micropores of the porous separator are not structurally deformed.

Further, another conventional technology includes fabricating a battery such that a cathode, an anode and a separator are stacked using a binary solvent of EC and PC as a plasticizer. However, when the binary solvent is used for a cathode or an anode, it is difficult to uniformly inject an electrolytic solution into the electrodes during the process, and mechanical strength is weakened, resulting in internal shorting.

SUMMARY OF THE INVENTION

To solve the above and other problems, the invention provides a method of preparing a lithium secondary battery comprising a separator which does not require moisture control and allows pores to remain therein even after the separator is treated with a gelled polymer, leading to fast impregnation of the electrolytic solution for improvement of battery performance.

Additional objects and advantages of the invention will be set forth in part in the description which follows and, in part, will be obvious from the description, or may be learned by practice of the invention.

In an aspect of the present invention, a method for preparing a lithium secondary battery includes surface-treating a porous separator to provide a coated weight of a gelled polymer that is less than or equal to 20 mg/cm$^2$ by impregnating the porous separator into a gelled polymer solution containing less than or equal to 5 wt % of the gelled polymer based on the weight of an organic solvent, interposing the surface-treated separator between a cathode and an anode to prepare an electrode assembly, placing the electrode assembly into a housing, injecting an electrolytic solution into the housing in which the electrode assembly is placed, sealing and curing the resultant structure.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
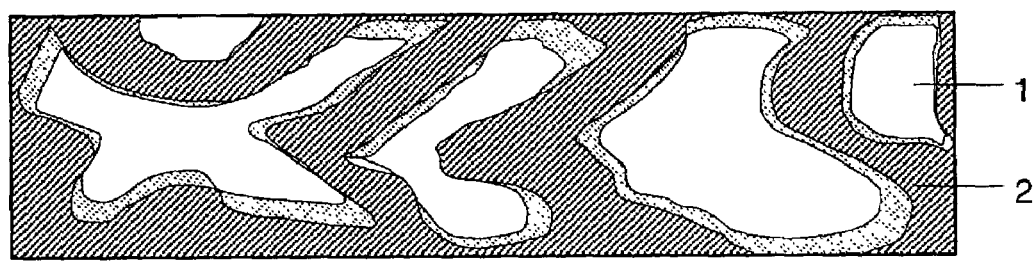
FIG. 1 is a schematic diagram of a separator according to an aspect of the present invention.

Reference will now be made in detail to the embodiments of the present invention, examples of which are illustrated in the accompanying drawings and specific examples. The embodiments are described below in order to explain the present invention by referring to the specific examples and figures.

A gelled polymer solution used in the present invention does not contain a lithium salt, but contains a gelled polymer in an amount of less than or equal to 5 wt % based on the weight of an organic solvent. Since a lithium salt is highly hygroscopic, a battery preparation process is generally necessarily an anhydrous process. However, the process is not an anhydrous process in the present invention. In other words, according to the present invention, the battery preparation process is not necessarily an anhydrous process, thereby simplifying the process. If the gelled polymer is contained in an amount of greater than or equal to 5 wt %, most pores of a porous separator are clogged with the gelled polymer. The clogged pores prevent uniform impregnation of an electrolytic solution and result in deterioration of battery performance.

The gelled polymer of the invention further includes a plasticizer according to another aspect of the invention. The plasticizer allows lamination to be performed at low temperature and reduced pressure. In other words, the plasticizer is an electrolyte solvent that is at a solid phase at room temperature and a liquid phase at a temperature greater than room temperature. When lamination is performed at a temperature greater than room temperature, the plasticizer is turned into a liquid phase to allow an electrode plate and a separator to be bonded to each other at a relatively low temperature.

Next, the porous separator is impregnated into the gelled polymer solution used in the present invention. The impregnated separator is surface-treated to provide an amount of the gelled polymer that is less than or equal to 20 mg/cm$^2$. The surface-treated separator is interposed between the cathode and the anode, thereby fabricating an electrode assembly. If the amount of the gelled polymer is greater than 20 mg/cm$^2$, the pores of the porous separator are clogged with the gelled polymer, resulting in deterioration of battery performance. Any impregnation method that is well known in the art can be used, and an impregnation time is preferably not greater than 20 minutes.

The fabricated electrode assembly is sealed with a metal foil to prevent a permeation of moisture or vapour. An electrolytic solution containing a lithium salt is injected into the sealed electrode assembly to produce a battery cell, which is cured by applying pressure and heat. During this operation, the gelled polymer is dissolved in the electrolytic solution and gelled by cooling to serve to provide adherence between the electrode and the separator.

The porous separator used in the invention is preferably one selected from the group consisting of polyethylene, polypropylene, and polypropylene/polyethylene/polypropylene. The group includes polymers incapable of absorbing the electrolytic solution to serve as a main support of the separator.

According to an aspect of the invention, the gelled polymer is one selected from the group consisting of polyvinylidenefluoride (PVdF), a polyvinylidenefluoride-hexafluoropropylene copolymer (PVdF-HFP), polyethylene oxide (PEO), polymethyl acrylate (PMA) and polyacrylonitrile (PAN). The gelled polymer is distributed on the surface of the porous separator and into pores together with a first solvent to allow the separator and the electrode to be adhered to each other.

According to an aspect of the present invention, usable lithium salts include $LiPF_6$, $LiBF_4$, $LiClO_4$, $Li(CF_3SO_2)_2$, $LiSbF_3$, and $LiAsF_6$.

In an embodiment of the invention, examples of the first solvent of the organic solvent include mixtures of ring-type carbonates selected from the group consisting of polyethylene carbonate, ethylene carbonate, propylene carbonate, and chain-type carbonates selected from the group consisting of dimethyl carbonate and diethyl carbonate. The first solvent remains in a battery even after assembling the battery and is electrochemically compatible with the electrolytic solution. Thus, the first solvent promotes the injection of the electrolytic solution into the battery, and facilitates an adherence between the electrode plate and the separator at low temperature and low pressure. A second solvent, which is a low boiling point solvent, is preferably one selected from the group consisting of acetone, acetonitrile, n-methyl-2-pyrrolidone (NMP) and mixtures thereof. The second solvent has a boiling point lower than that of the first solvent, and serves to dissolve the gelled polymer in cooperation with the first solvent. The second solvent is removed when the gelled polymer and the first solvent are applied to the porous separator and are dried. In other words, the second solvent serves to distribute, minutely and uniformly, and impregnate the gelled polymer and the first solvent into the porous separator. The first solvent and the second solvent are mixed in a weight ratio of 1:2 to 1:20. If the mixture ratio is out of this range, an excessively large or small amount of polymer is undesirably coated onto the separator.

A third solvent contained in the electrolytic solution used in the present invention is preferably the same as the first solvent, but need not always be the same. The third solvent activates the electrolytic solution uniformly in the electrode plate within a short time by solving a problem during injection of the electrolytic solution due to surface tension between different materials. Another advantage is that there is no necessity of separately extracting the first solvent.

In an embodiment of the present invention, the curing operation is generally performed at approximately 50° C. to approximately 80° C., in which micropores of the separator are not affected. If the curing temperature is lower than 50° C., the curing is not sufficiently performed. If the curing temperature is higher than 80° C., the micropore structure of the porous separator is adversely affected.

The fabricated separator is schematically shown in FIG. 1. As shown in FIG. 1, since the gelled polymer and the first solvent are minutely adhered to the micropore structure (i.e., pores 1 of a porous separator 2), a problem during injection of an electrolytic solution due to surface tension between different materials can be solved. Thus the electrolytic solution is allowed to be activated uniformly in an electrode plate within a short time. Also, since the first solvent exists in the gelled polymer, shrinkage of the porous separator does not occur when drying the solvent. Further, when used in a stacking type battery, the first solvent reduces the temperature and pressure for bonding a cathode and an anode. This reduction is possible because the first solvent is in a solid phase at room temperature and in a liquid phase at a temperature higher than room temperature. That is, during lamination, the first solvent is converted into a liquid phase to allow the cathode and the anode to be bonded to each other even at a relatively low temperature.

The present invention is described in greater detail below by referring to representative Examples. However, the representative Examples are only for the purposes of illustration and the present invention is understood not to be limited thereto.

EXAMPLE 1

Fabrication of a Cathode Plate 20 g of a vinylidenefluoride/hexafluoropropylene copolymer (containing 15 wt % of hexafluoropropylene) as a binder was added to an organic solvent prepared by mixing 250 ml of cyclo-hexanone and 250 ml of acetone and mixed using a ball mill for 2 hours to be dissolved. 1000 g of $LiCoO_2$ as a cathode active material and 20 g of carbon black as a conductive agent were added to the resulting mixture and then mixed for 8 hours to form a cathode active material composition. Next, 20 g of a vinylidenefluoride/hexafluoropropylene copolymer (containing 15 wt % of hexafluoropropylene) and 20 g of carbon black were added to an organic solvent prepared by mixing 250 ml of cyclo-hexanone and 250 ml of acetone and mixed for 8 hours to prepare a pretreated composition. The pretreated composition was coated onto an aluminum foil having a thickness of 147 μm and a width of 4.9 cm by spray coating for pretreatment of the aluminum foil. Finally, the cathode active material composition was coated on the aluminum foil using a doctor blade having a gap of 320 μm and dried to form a cathode plate.

Fabrication of an Anode Plate 20 g of a vinylidenefluoride/hexafluoropropylene copolymer (containing 15 wt % of hexafluoropropylene) as a binder was added to an organic solvent prepared by mixing 300 ml of N-methylpyrrolidone and 100 ml of acetone and mixed using a ball mill for 2 hours to be dissolved. 1000 g of mesocarbon fiber (MCF) as an anode active material was added to the mixture and then mixed for 3 hours to form an anode active material composition. Next, 50 g of a vinylidenefluoride/hexafluoropropylene copolymer (containing 15 wt % of hexafluoropropylene) and 5 g of carbon black were added to an organic solvent prepared by mixing 300 ml of N-methylpyrrolidone and 100 ml of acetone and mixed for 2 hours to prepare a pretreated composition. The pretreated composition was coated onto a copper foil having a thickness of 178 μm and a width of 5.1 cm by spray coating for pretreatment of the copper foil. Finally, the anode active material composition was coated on the copper foil using a doctor blade having a gap of 420 μm and dried to form an anode plate.

Fabrication of Separator

A separator according to the invention was made as follows: a base non-woven polyethylene (PE) fiber sheet (WEB DYNAMICS, Px0074) was used. The manufacturer's specifications of the material include a thickness dimension of 2.5 mils and a pore size to not exceed 0.1 mm. The product is manufactured having a rough surface on one side and a smooth surface on the other side. The density of material was empirically determined as 28 $g/m^2$. Polypropylene carbonate was used as a first solvent and acetonitrile was used as a second solvent in a mixture ratio by weight of 10:165.

Figure 2:
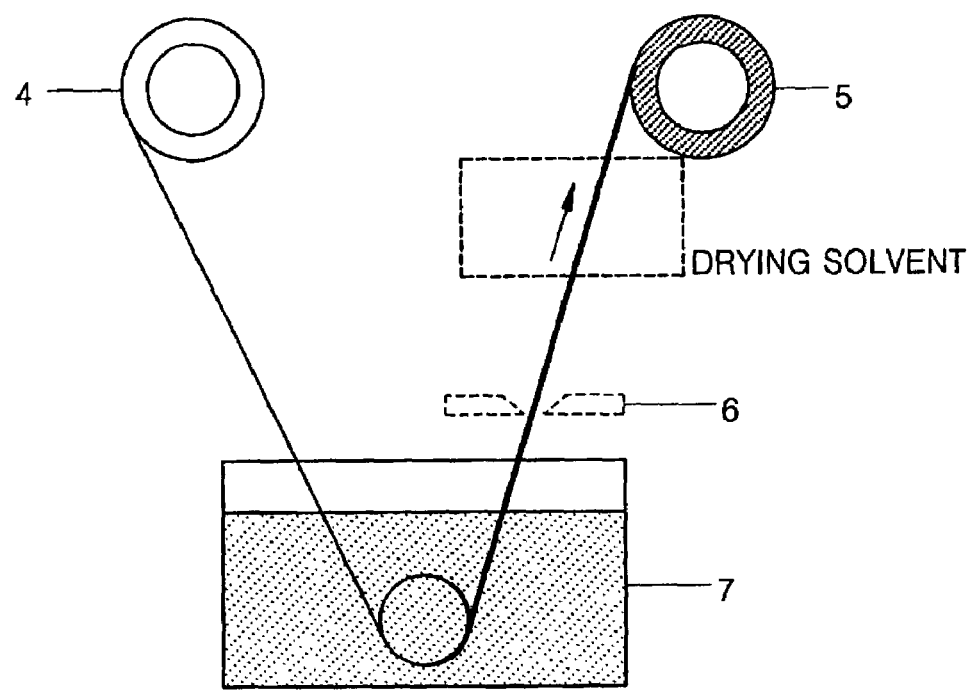
FIG. 2 illustrates a method for preparing the separator according to an aspect of the present invention.
Figure 3A:
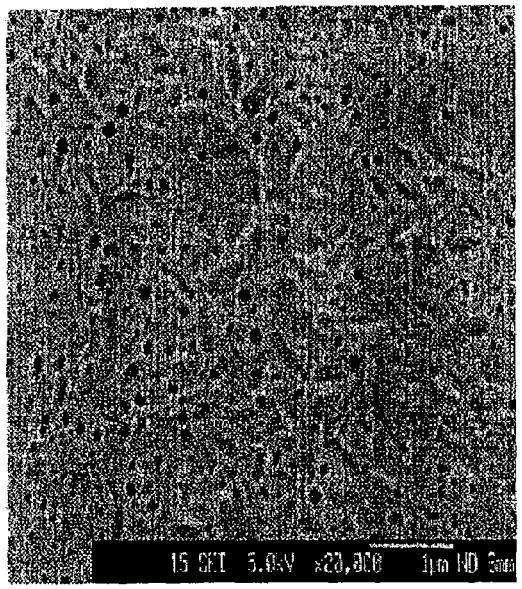
FIG. 3A is a scanning electron microscope (SEM) photograph of the separator according to the present invention and FIG. 3B is an SEM photograph of a separator which is not surface-treated.
Figure 3B:
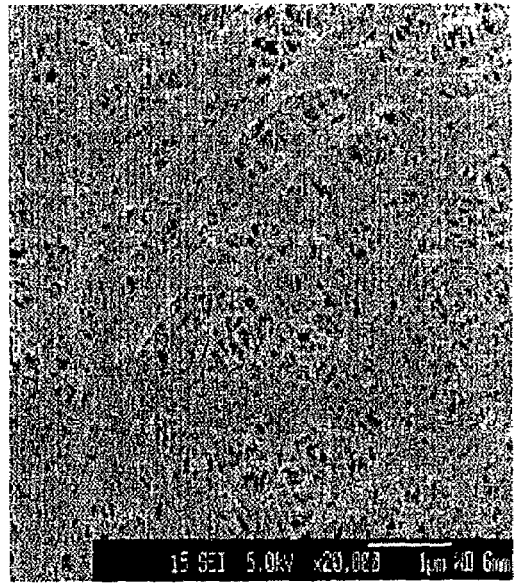
Figure 4:
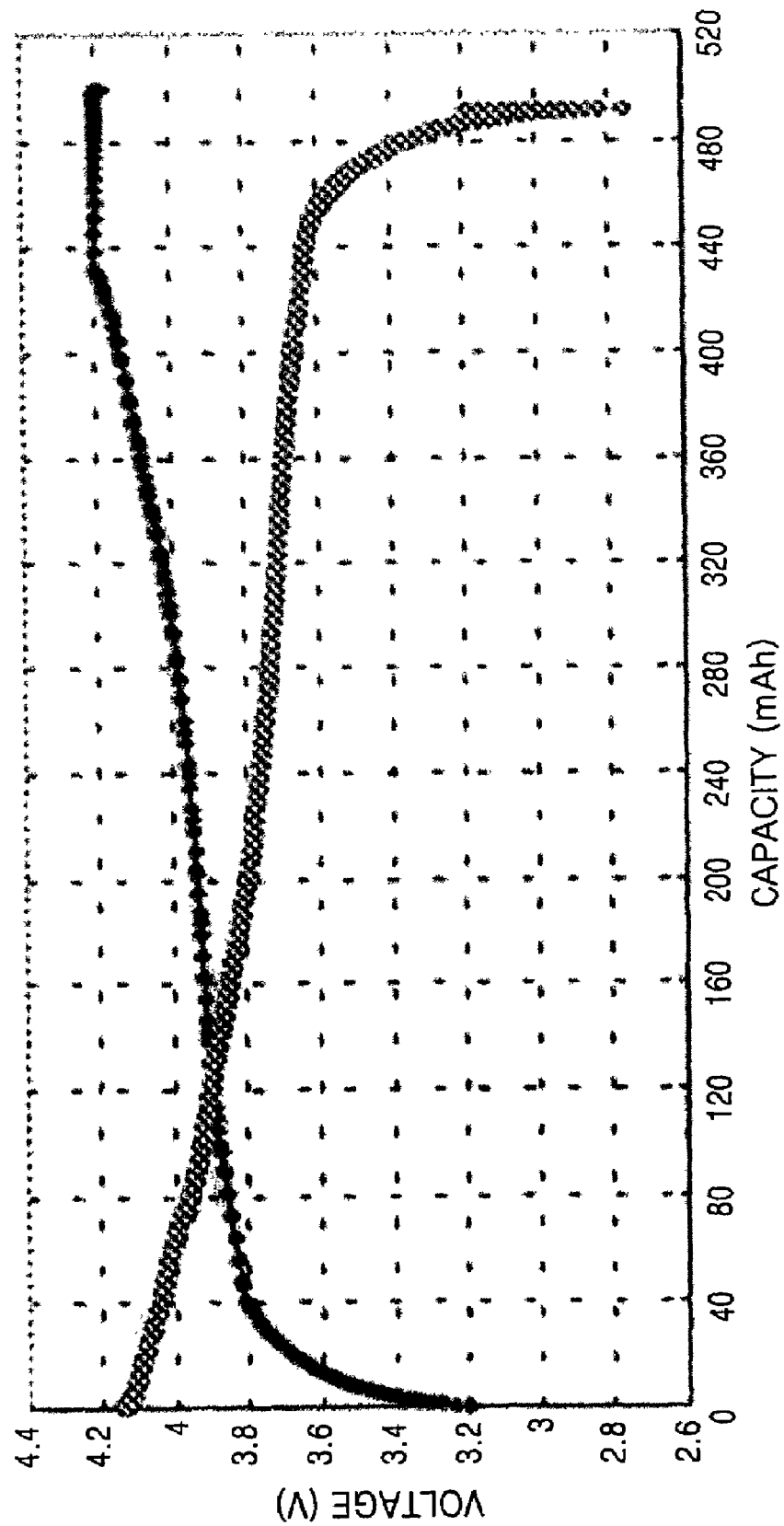
FIG. 4 is a graph showing the standard charge/discharge capacity of a lithium battery according to the present invention.
Figure 5:
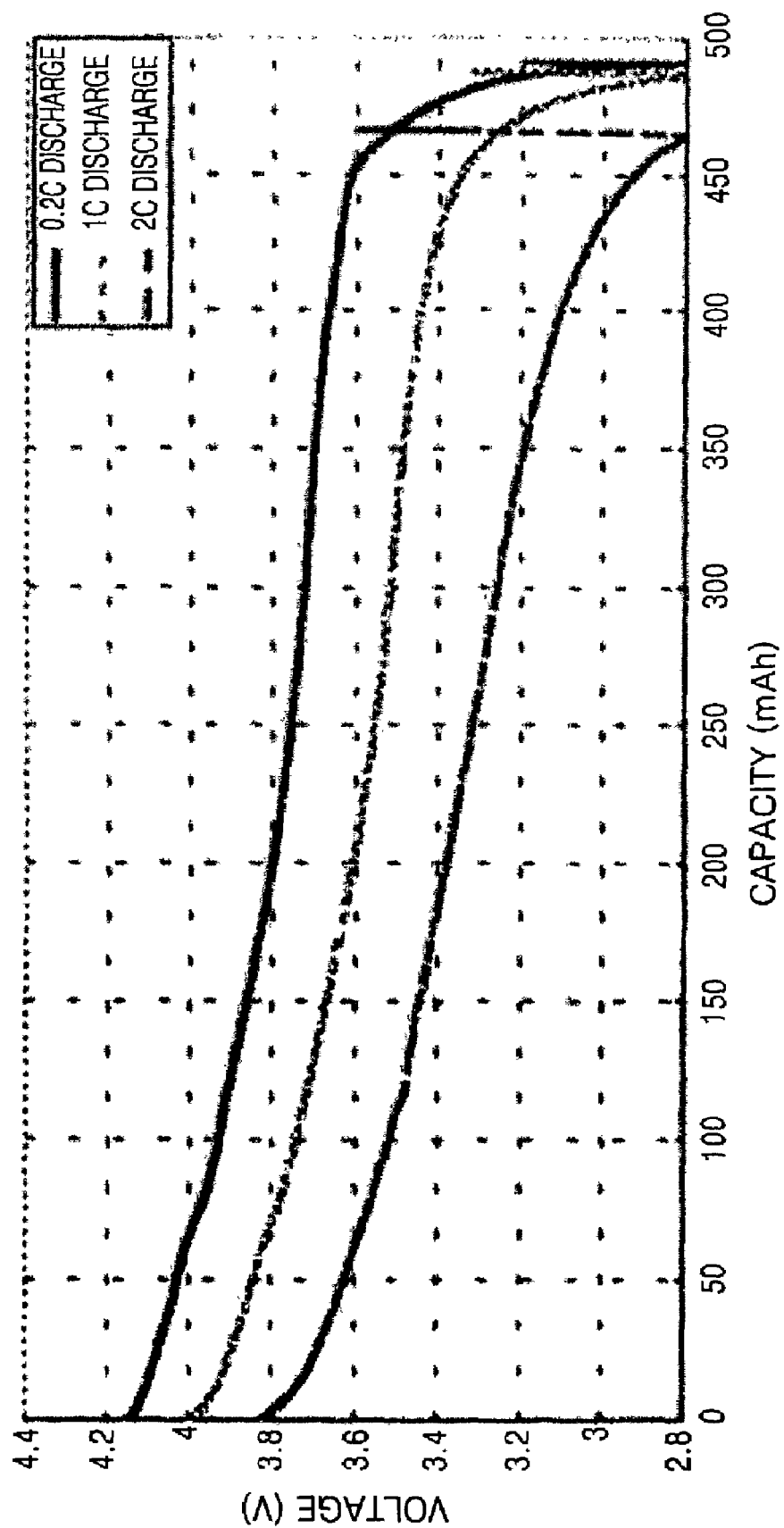
FIG. 5 is a graph showing the average high-rate (2 C) discharge capacity of the lithium battery according to the present invention.
Figure 6:
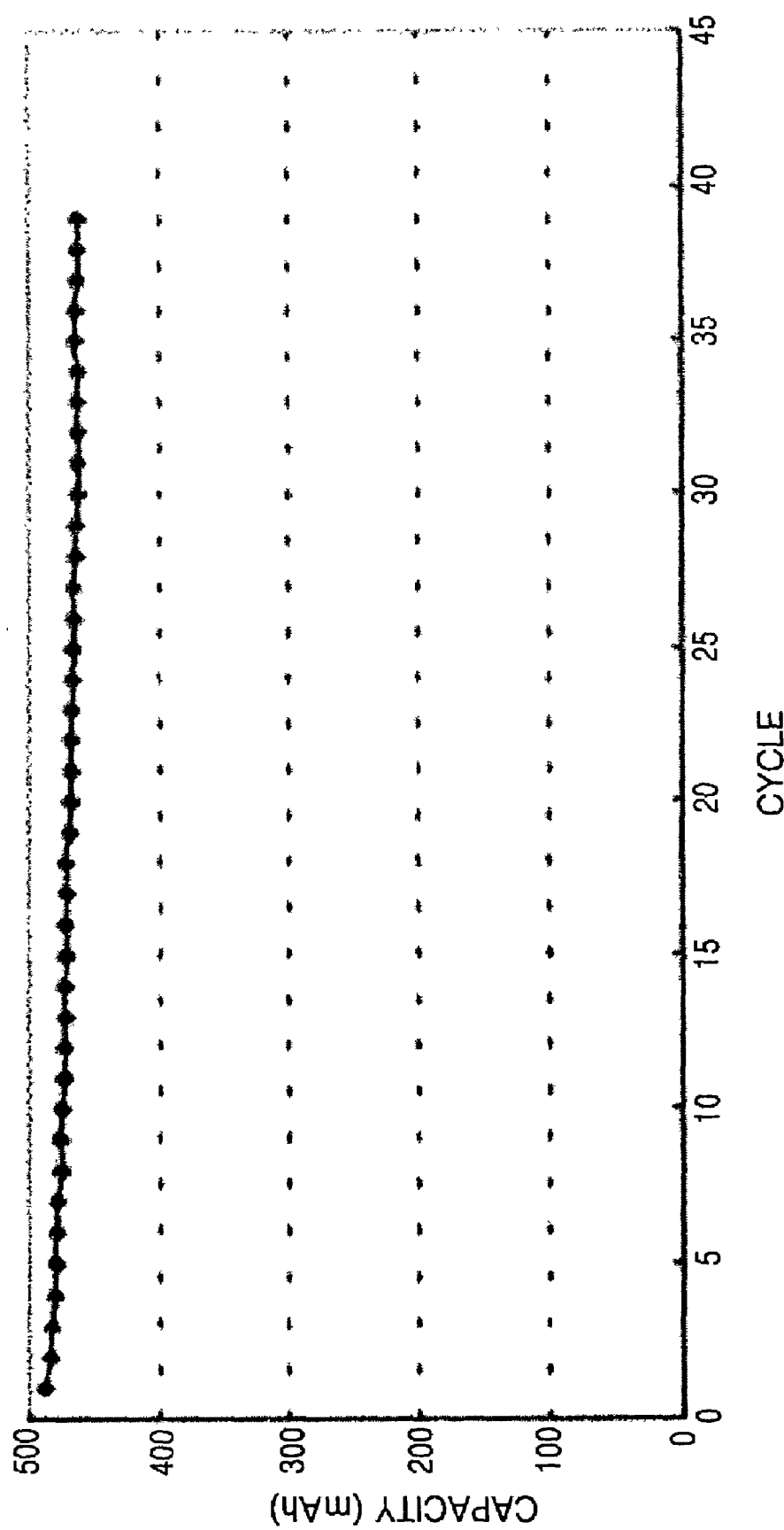
FIG. 6 is a graph showing the cycle of the lithium battery according to the present invention.
Figure 7:
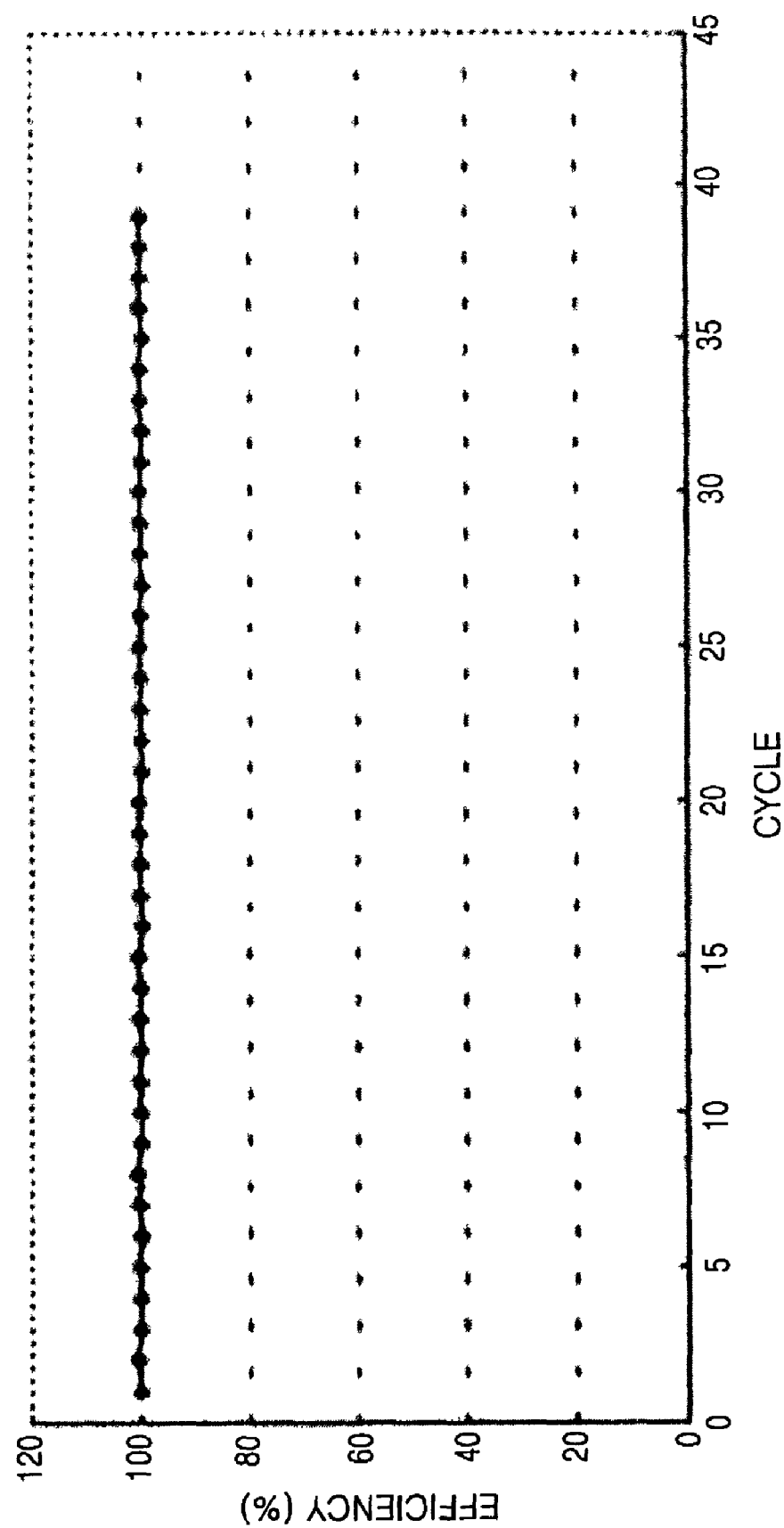
FIG. 7 is a graph showing the cycle-dependent charge/discharge efficiency (1 C) of the lithium battery according to the present invention.

As shown in FIG. 2, 5 g of PEO as gelled polymer was dissolved in 500 g of the organic solvent to prepare 1 wt % of a gelled polymer solution to be put into a container 7. Then, the non-woven PE fiber sheet was supplied from a separator unwinder 4 to the container 7 and impregnated for approximately 1 second. The sheet was wound using a separator rewinder 5 to adjust the thickness thereof by means of a thickness adjusting slit gap 6. Next, the second solvent acetonitrile was dried, thereby completing the separator. Here, coated weight of the gelled polymer was 10 $mg/cm^2$. FIG. 3A is a scanning electron microscopic (SEM) photograph of the fabricated separator. For comparison, the SEM photograph of a separator that is not surface-treated is shown in FIG. 3B.

Assembling of Battery

A cathode and an anode were produced by blanking the cathode and anode plates, respectively, and the separator was interposed therebetween, followed by binding the separator and the electrodes at a temperature of approximately 50° C., packaging into a housing made of a multi-layer film, and injecting an electrolytic solution into the housing, thereby fabricating a battery. The battery was fabricated by stacking 7 sheets of anodes and 6 sheets of cathodes in the following order: an anode, a separator, a cathode, a separator and an anode. The anodes were used as both outermost electrodes. The housing used as a casing of the battery was a multi-layer film having a thickness of 115 μm.

EXAMPLE 2

A battery was prepared in the same manner as in Example 1, except that 1.5 wt % of a PEO solution was used as a gelled polymer solution. A coated weight of the gelled polymer was 0.1 $mg/cm^2$.

EXAMPLE 3

A battery was prepared in the same manner as in Example 1, except that 2 wt % of a PEO solution was used as a gelled polymer solution. A coated weight of the gelled polymer was 0.5 $mg/cm^2$.

EXAMPLE 4

A battery was prepared in the same manner as in Example 1, except that 4 wt % of a PEO solution was used as a gelled polymer solution. A coated weight of the gelled polymer was 1 $mg/cm^2$.

EXAMPLE 5

A battery was prepared in the same manner as in Example 1, except that 5 g PVdF was used instead of PEO. A coated weight of the gelled polymer was 1 $mg/cm^2$.

COMPARATIVE EXAMPLE 1

A battery was prepared in the same manner as in Example 1, except that 10 wt % of a PEO solution was used as a gelled polymer solution. A coated weight of the gelled polymer was 750 $mg/cm^2$.

COMPARATIVE EXAMPLE 2

A battery was prepared in the same manner as in Example 1, except that the separator was impregnated into the gelled polymer solution for approximately 1 hour. A coated weight of the gelled polymer was 800 $mg/cm^2$.

EVALUATION EXAMPLE

Battery Performance Test

The batteries according to Examples 1-5 and Comparative Examples 1-2 were evaluated and the results thereof are shown below

TABLE 1

|  | Average Standard Discharge Capacity (mAh) | Average High-Rate (2C) Discharge Capacity (%) relative to Standard Discharge Capacity | Average 1C Discharge Capacity (%) relative to Standard Discharge Capacity |
| --- | --- | --- | --- |
| Example 1 | 555 | 97.4 | 99.6 |
| Example 2 | 540 | 95.2 | 99.0 |
| Example 3 | 548 | 93.1 | 97.4 |
| Example 4 | 510 | 87.2 | 95.1 |
| Example 5 | 511 | 82 | 94.1 |
| Comparative Example 1 | 300 | 1.2 | 9.1 |
| Comparative Example 2 | 300 | 0 | 10.0 |

Referring to Table 1, it is confirmed that the standard discharge capacities of the batteries according to the present invention are better than the standard discharge capacities of conventional batteries.

FIGS. 4 through 7, related to Example 1, show the standard charge/discharge capacity curves, discharge curves by rate, cycling characteristics, and efficiency by cycle, respectively, for a battery according to the present invention.

The separator according to the present invention includes micropores for facilitating impregnation of an electrolytic solution. Also, since the separator does not include a salt, strictly controlling moisture is not necessary before injection of the electrolytic solution, that is, a separator treatment process is simplified. Further, the separator can be stacked at low temperature and reduced pressure, by which the micropore structure is not adversely affected. Lithium secondary batteries prepared according to the present invention are good in performance and leakage resistance and can reduce occurrence of internal short-circuiting.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of preparing a lithium secondary battery comprising:
    surface-treating a porous separator to provide a coated weight of a gelled polymer that is less than or equal to 20 mg/cm$^2$ by impregnating the porous separator with a gelled polymer solution containing an organic solvent and less than or equal to 5 wt % of the gelled polymer based on a weight of the organic solvent such that the gelled polymer solution enters and adheres to surfaces of the pores of the porous separator;
    interposing the porous separator between a cathode and an anode to prepare an electrode assembly;
    placing the electrode assembly into a housing;
    injecting an electrolytic solution into the housing in which the electrode assembly is placed to provide a resultant structure; and
    sealing and curing the resultant structure, wherein at least a portion of the organic solvent remains in pores of the separator with the gelled polymer after the sealing and curing of the resultant structure.

2. The method according to claim 1, wherein the porous separator is selected from the group consisting of polyethylene, polypropylene, and polypropylene/polyethylene/polypropylene.

3. The method according to claim 1, wherein the gelled polymer is selected from the group consisting of polyvinylidenefluoride (PVdF), a polyvinylidenefluoride-hexafluoropropylene copolymer (PVdF-HFP), polyethylene oxide (PEG), polymethyl acrylate (PMA) and polyacrylonitrile (PAN).

4. The method according to claim 1, wherein the electrolytic solution includes a lithium salt, and the lithium salt is selected from the group consisting of LiPF$_6$, LiBF$_4$, LiClO$_4$, Li(CF$_3$SO$_2$)$_2$, LiSbF$_3$, and LiAsF$_6$.

5. The method according to claim 1, wherein the organic solvent includes a first solvent and a second solvent, and the first solvent has a boiling point higher than a boiling point of the second solvent.

6. The method according to claim 5, wherein the second solvent is removed after impregnating the porous separator with the gelled polymer.

7. The method according to claim 5, wherein the first solvent is a mixture of a ring-type carbonate selected from the group consisting of polyethylene carbonate, ethylene carbonate, propylene carbonate, and a chain-type carbonate selected from the group consisting of dimethyl carbonate and diethyl carbonate.

8. The method according to claim 5, wherein the second solvent is selected from the group consisting of acetone, acetonitrile, n-methyl-2-pyrrolidone (NMP) and mixtures thereof.

9. The method according to claim 5, wherein the first solvent and the second solvent are mixed in a weight ratio of 1:2 to 1:20.

10. The method according to claim 1, wherein a third solvent, which is a same solvent as the first solvent, is contained in the electrolytic solution.

11. The method according to claim 1, wherein the curing is performed at approximately 50° C. to approximately 80° C.

12. A lithium secondary battery comprising:
    a housing;
    an electrode assembly comprising a cathode, an anode, and a porous separator interposed there between; and
    an electrolytic solution;
    wherein:
        the porous separator is surface-treated with a gelled polymer to provide a coated weight of the gelled polymer less than or equal to 10 mg/cm$^2$ by impregnating the porous separator with a solution containing an organic solvent and less than or equal to 5 wt % of the gelled polymer based on a weight of the organic solvent such that the gelled polymer solution enters and adheres to surfaces of the pores of the porous separator;
        at least a portion of the organic solvent remains in pores of the separator with the gelled polymer after assembly of the battery,
        the electrode assembly is located in the housing,
        the electrolytic solution is injected into the housing, and
        the housing is sealed and cured.

13. The battery according to claim 12, wherein the porous separator is selected from the group consisting of polyethylene, polypropylene, and polypropylene/polyethylene/polypropylene.

14. The battery according to claim 12, wherein the gelled polymer is selected from the group consisting of polyvinylidenefluoride (PVdF), a polyvinylidenefluoride-hexafluoropropylene copolymer (PVdF-HFP), polyethylene oxide (PEO), polymethyl acrylate (PMA) and polyacrylonitrile (PAN).

15. The battery according to claim 12, wherein the lithium salt is selected from the group consisting of $LiPF_6$, $LiBF_4$, $LiClO_4$, $Li(CF_3SO_2)_2$, $LiSbF_3$, and $LiAsF_6$.

16. The battery according to claim 12, wherein the organic solvent includes a first solvent and a second solvent, and the first solvent has a boiling point higher than a boiling point of the second solvent.

17. The battery according to claim 16, wherein the second solvent is removed after impregnating the porous separator with the gelled polymer.

18. The battery according to claim 16, wherein the first solvent is a mixture of ring-type carbonate selected from the group consisting of polyethylene carbonate, ethylene carbonate, propylene carbonate, and chain-type carbonate selected from the group consisting of dimethyl carbonate and diethyl carbonate.

19. The battery according to claim 16, wherein the second solvent is selected from the group consisting of acetone, acetonitrile, n-methyl-2-pyrrolidone (NMP) and mixtures thereof.

20. The battery according to claim 16, wherein the first solvent and the second solvent are mixed in a weight ratio of 1:2 to 1:20.

21. The battery according to claim 12, wherein a third solvent, which is a same solvent as the first solvent, is contained in the electrolytic solution.

22. The battery according to claim 12, wherein the curing is performed at approximately 50° C. to approximately 80° C.

23. A method of preparing a lithium secondary battery comprising:
surface-treating a porous separator to provide a coated weight of a gelled polymer by impregnating the porous separator with a gelled polymer solution containing the gelled polymer and a two part organic solvent including a first solvent and a second solvent, the first solvent having a higher boiling point than the second solvent;
removing the second solvent;
interposing the porous separator having a remainder of the first solvent between a cathode and an anode to prepare an electrode assembly;
placing the electrode assembly into a housing;
injecting an electrolytic solution into the housing in which the electrode assembly is placed to provide a resultant structure; and
sealing and curing the resultant structure, wherein at least a portion of the first solvent remains in pores of the separator with the gelled polymer after the sealing and curing of the resultant structure.

24. The method of claim 23, wherein the gelled polymer in the solution is less than or equal to 5 wt % of the two part organic solvent.

25. The method of claim 23, wherein the porous separator is selected from the group consisting of polyethylene, polypropylene, and polypropylene/polyethylene/polypropylene.

26. The method of claim 23, wherein the gelled polymer is selected from the group consisting of polyvinylidenefluoride (PVdF), a polyvinylidenefluoride-hexafluoropropylene copolymer (PVdF-HFP), polyethylene oxide (PEO), polymethyl acrylate (PMA) and polyacrylonitrile (PAN).

27. The method of claim 23, wherein the electrolytic solution includes a lithium salt, and the lithium salt is selected from the group consisting of $LiPF_6$, $LiBF_4$, $LiClO_4$, $Li(CF_3SO_2)_2$, $LiSbF_3$, and $LiAsF_6$.

28. The method according to claim 23, wherein the first solvent is a mixture of a ring-type carbonate selected from the group consisting of polyethylene carbonate, ethylene carbonate, propylene carbonate, and a chain-type carbonate selected from the group consisting of dimethyl carbonate and diethyl carbonate.

29. The method according to claim 23, wherein the second solvent is selected from the group consisting of acetone, acetonitrile, n-methyl-2-pyrrolidone (NMP) and mixtures thereof.

30. The method according to claim 23, wherein the first solvent and the second solvent are mixed in a weight ratio of 1:2 to 1:20.

31. The method according to claim 23, wherein the electrolytic solution includes the first solvent.

32. The method according to claim 23, wherein the curing is performed at approximately 50° C. to approximately 80° C.

* * * * *